United States Patent
Okada et al.

(10) Patent No.: US 9,259,653 B2
(45) Date of Patent: Feb. 16, 2016

(54) COMPUTER NETWORKED MULTI-PLAYER CHARACTER GAMING SYSTEM

(75) Inventors: Atsushi Okada, Tokyo (JP); Sei Sato, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 348 days.

(21) Appl. No.: 13/808,756

(22) PCT Filed: Feb. 8, 2011

(86) PCT No.: PCT/JP2011/052600
§ 371 (c)(1),
(2), (4) Date: Jan. 7, 2013

(87) PCT Pub. No.: WO2012/014506
PCT Pub. Date: Feb. 2, 2012

(65) Prior Publication Data
US 2013/0116052 A1    May 9, 2013

(30) Foreign Application Priority Data
Jul. 26, 2010    (JP) .................................. 2010-166734

(51) Int. Cl.
*A63F 13/10*    (2006.01)
*A63F 13/45*    (2014.01)
*A63F 13/55*    (2014.01)
*A63F 13/40*    (2014.01)
*A63F 13/30*    (2014.01)

(52) U.S. Cl.
CPC .................. *A63F 13/45* (2014.09); *A63F 13/10* (2013.01); *A63F 13/12* (2013.01); *A63F 13/55* (2014.09); *A63F 2300/5533* (2013.01)

(58) Field of Classification Search
CPC ............ A63F 9/24; A63F 13/10; A63F 13/12; A63F 13/45; A63F 13/55; A63F 2300/5533
See application file for complete search history.

(56) References Cited

U.S. PATENT DOCUMENTS

| | | | |
|---|---|---|---|
| 2003/0008713 A1* | 1/2003 | Ushiro et al. | 463/42 |
| 2008/0046397 A1* | 2/2008 | Shirai et al. | 707/1 |
| 2012/0309543 A1* | 12/2012 | Shimada | 463/42 |

FOREIGN PATENT DOCUMENTS

| | | |
|---|---|---|
| JP | 2002-360936 A | 12/2002 |
| JP | 2006-223893 A | 8/2006 |
| JP | 2010-131076 A | 6/2010 |

OTHER PUBLICATIONS

Miller, Greg. Fat Princess Review [online]. Aug. 3, 2009 [retrieved Feb. 19, 2015]. Retrieved from the Internet: <URL: http://www.ign.com/articles/2009/08/03/fat-princess-review>.*

Int'l Search Report, Apr. 19, 2011, Japanese Pat Office.

* cited by examiner

*Primary Examiner* — Dmitry Suhol
*Assistant Examiner* — David Duffy
(74) *Attorney, Agent, or Firm* — Duane Morris LLP (57) ABSTRACT

In a system comprising the disclosed server and a plurality of player terminals, it is possible to suitably and easily alter the accessories and character class of player characters. The server has: a memory means that stores player character data of a plurality of player terminals; a means that confers data indicating the fact that a player character indicated in a party formation command has been added to the same party when a party formation command has been input from a player terminal; a means that acquires changes regarding the accessories or player class of the player character in each player terminal, and updates the character data stored in memory; a means that extracts the other players that form the same party as the player character for which changes have been output; and a means for transmitting said changes to the terminals of the other players that were extracted.

7 Claims, 6 Drawing Sheets

TB

| ARMS | CLASS (CHARACTER STRING) | CG ID | | |
|---|---|---|---|---|
| SWORD | 001 (SWORDMAN) | 101 | | |
| STICK | 002(MAGICIAN) | 102 | | |
| FISHING ROD | 003 (FISHERMAN) | 103 | | |
| HAMMER | 004 (BLACKSMITH) | 104 | | |
| | | | | |
| | | | | |
| | | | | |
| | | | | |

| ARMS | CLASS (CHARACTER STRING) | CG ID | | |
|---|---|---|---|---|
| SWORD | 001 (SWORDMAN) | 101 | | |
| STICK | 002 (MAGICIAN) | 102 | | |
| FISHING ROD | 003 (FISHERMAN) | 103 | | |
| HAMMER | 004 (BLACKSMITH) | 104 | | |
| ⋮ | ⋮ | ⋮ | | |
| | | | | |
| | | | | |
| | | | | |

FIG. 8

COMPUTER NETWORKED MULTI-PLAYER CHARACTER GAMING SYSTEM

TECHNICAL FIELD

The invention relates to a server, a game device and program executed by the server, for suitably and easily changing character classes and accessories of respective player characters in an online game according to a situation in a game and properly informing the other players that form the same party of such a change.

BACKGROUND ART

In a conventional known video game, such as a role playing game, it is possible to alter character classes, such as a solider, a warlock and a blacksmith, and accessories, such as arms, a protective gear, clothes and an ornament, regarding a player character operated by a player in a game through an operation input by the player as patent related documents 1 and 2 shown below.

PRIOR ART

Patent Related Document

Patent related document 1: Patent application publication No. 2002-200350
Patent related document 2: Patent application publication No. 2003-210846

DISCLOSURE OF INVENTION

Problems to be Solved by Invention

In a general setting, a uniform effect is not shown even if the accessory is equipped in any character class, especially arms of the accessories. For example, in a case where there are "sword" and "stick" as examples of arms, an ability level of the player character becomes bigger if "sword" is equipped in "solider" character class, but the ability level does not rise even if it is equipped in "warlock" and "blacksmith" character class. And, the ability level of the player character becomes bigger if "stick" is equipped in "warlock" character class, but the ability level does not rise even if it is equipped in "solider" and "blacksmith" character class.

For such a reason, in order to alter the accessory, such as the arms, it is necessary to alter the character class into one suitable to the altered accessory. Then, it is necessary to understand a relation between the accessory and the character class to some extent in order to suitably alter the accessory and the character class, and it is difficult especially for game beginner players.

If the player does not properly inform the other players that form the same party of such change of the accessory and the character class of his own player character in an online game, and a smooth game progress is not possible afterwards.

Then, an object of the invention is to provide a game system for suitably and easily alter the accessories and character classes of the player characters, and properly informing the other players that form the same party of such a change of the accessory and the character class of his own player character so as to easily play the online game for game beginner players, that is, to provide a server, a game device and program to be executed by the server for doing such things.

Means for Solving Problems

A first aspect of the invention is a game device (1) having game progress controller (52) that plays a game with a player character that can take actions in a game space through an input operation of a player, said game device comprising:
 Referring component (51) that accesses and refers to an association relation (TB) between an accessory (arms) and a character class (class);
 accessory change component (53) that changes the accessory for the player character through an input operation from the player;
 character class detecting component (53) that detects the character class corresponding to the accessory to be changed based upon the association relation that is referred through said referring component; and
 character class change component(53) that changes the character class of said player character into the detected character class.

A second aspect of the invention is game facilities having two or more player terminals (200) and a server (300) that are respectively connected via a network (100), for allowing a player character (A, B, C)corresponding to said each player terminal to take actions in a common game space formed on the server through an input operation at said each player terminal, said server having:
 party formation component that forms the player characters corresponding to the two or more player terminals as a party based upon an input from these player terminals;
 information intermediation component that obtains and intermediates change information to each player character formed as said party through an input operation in each player terminal and transmits the change information to the other player terminal; and
 message intermediation component that obtains and intermediates a message by an input in each player terminal and transmits to the other player terminal;
 said player terminal having:
 game progress controlling component that plays a game with the player characters that can take actions in said game space through an input operation of the player;
 referring component that accesses and refers to a first association relation (TB) between the accessory and a graphic object of the accessory and a second association relation (TB) between the accessory and the character class;
 accessory changing component that changes the accessory according to an input operation from the player for said player character;
 graphic object detecting component (54) that detects the graphic object corresponding to said changed accessory based upon the first association relation that is referred by said referring component;
 image changing component (54) that transmits information of said detected graphic object to said server and changes the image of the accessory of the player character based upon the graphic object obtained from said server;
 character class detecting component that detects the character class corresponding to the said changed accessory based upon the second association relation that is referred by said referring component; and
 character class changing component that changes the character class of said player character into the detected character class; and
 message transmitting component (58) that transmits the inputted message to said server.

A third aspect of the invention is a game program (70) for enabling a computer (1) to execute a game with player character that can take actions in a game space through an input operation from a player, said game program comprising:
 changing an accessory according to an input operation from the player for said player character;

accessing and referring to an association relation between the accessory and a character class;

detecting the character class corresponding to said changed accessory based upon said association relation referred; and changing the character class of said player character into the detected character class.

According to the invention, if the accessory is changed, the proper character class corresponding to the changed accessory is automatically set, and the accessory and the character class of the player character can be suitably and easily changed and it is easy for even a game beginner player.

Besides, the other player who forms a party together is properly informed of the change of the accessory and the character class of own player character in an online-game, and the succeeding game can be smoothly progressed thereby.

EMBODIMENTS FOR CARRYING OUT THE INVENTION

Figure 1:
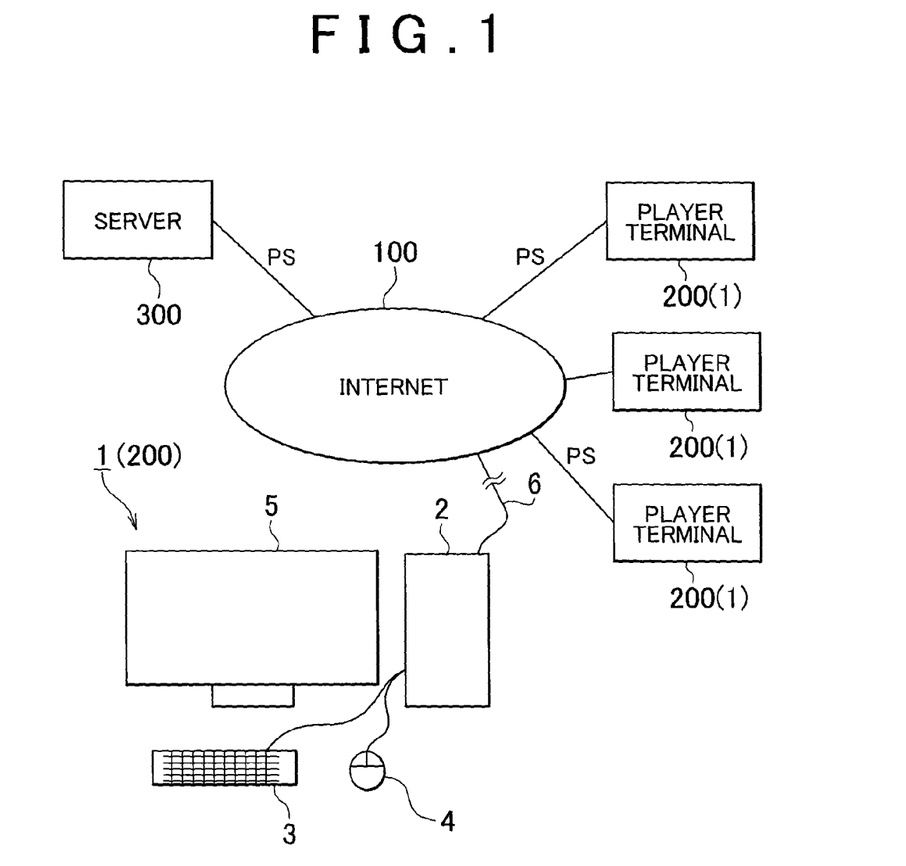
FIG. 1 is a view showing an instance of a game device to which the invention is applied.

An embodiment of the invention is now explained, referring to appended drawings. As shown in FIG. 1, a game device 1 is a computer, such as a general purpose computer. The game device 1 has a main body 2, and a keyboard 3, a mouse 4 and the like that are input devices are connected with the main body 2. Besides, a monitor 5 that is an image output device is connected with the main body 2. An arithmetic unit and a storage device (not shown) are built in the main body 2. The main body 2 has a network controller (not shown) connected with the Internet via a network cable 6. The game device 1 exemplarily shown in FIG. 1 is only an embodiment of the game device according to the invention, and the game device according to the invention may be the other personal computers, desktop domestic game devices, portable game devices, PDAs, portable multi media players, smart phones, mobile phones, and arcade game devices.

Figure 2:
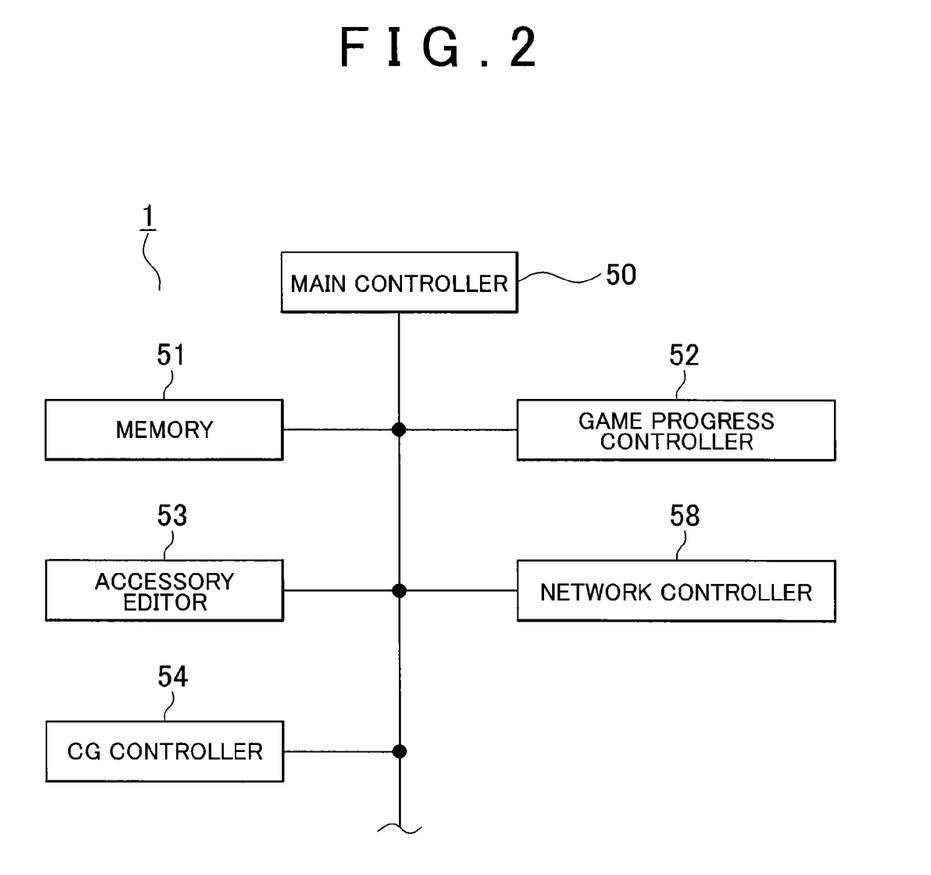
FIG. 2 is a block diagram that shows respective control portions of the game device of FIG. 1 as an instance.

Subsequently, the game device 1 is now explained in connection with its functions based upon FIG. 2. The game device 1 that is a computer has a main controller 50 as an arithmetic unit, a memory 51 as a memory device, such as a RAM and a HDD, a game progress controller 52, an accessory editor 53, a CG controller 54, a network controller 58, as shown in FIG. 2. The network controller 58 controls a communication via the Internet 100.

A server 300 that is also a computer is connected with a player terminal 200 having a structure similar to the game device 1 via a public communication line, such as the Internet 100, and the server 300 controls MMORPG (Massively Multiplayer Online Role-Playing Game) based upon information inputted by respective players via respective player terminals 200.

Figure 8:
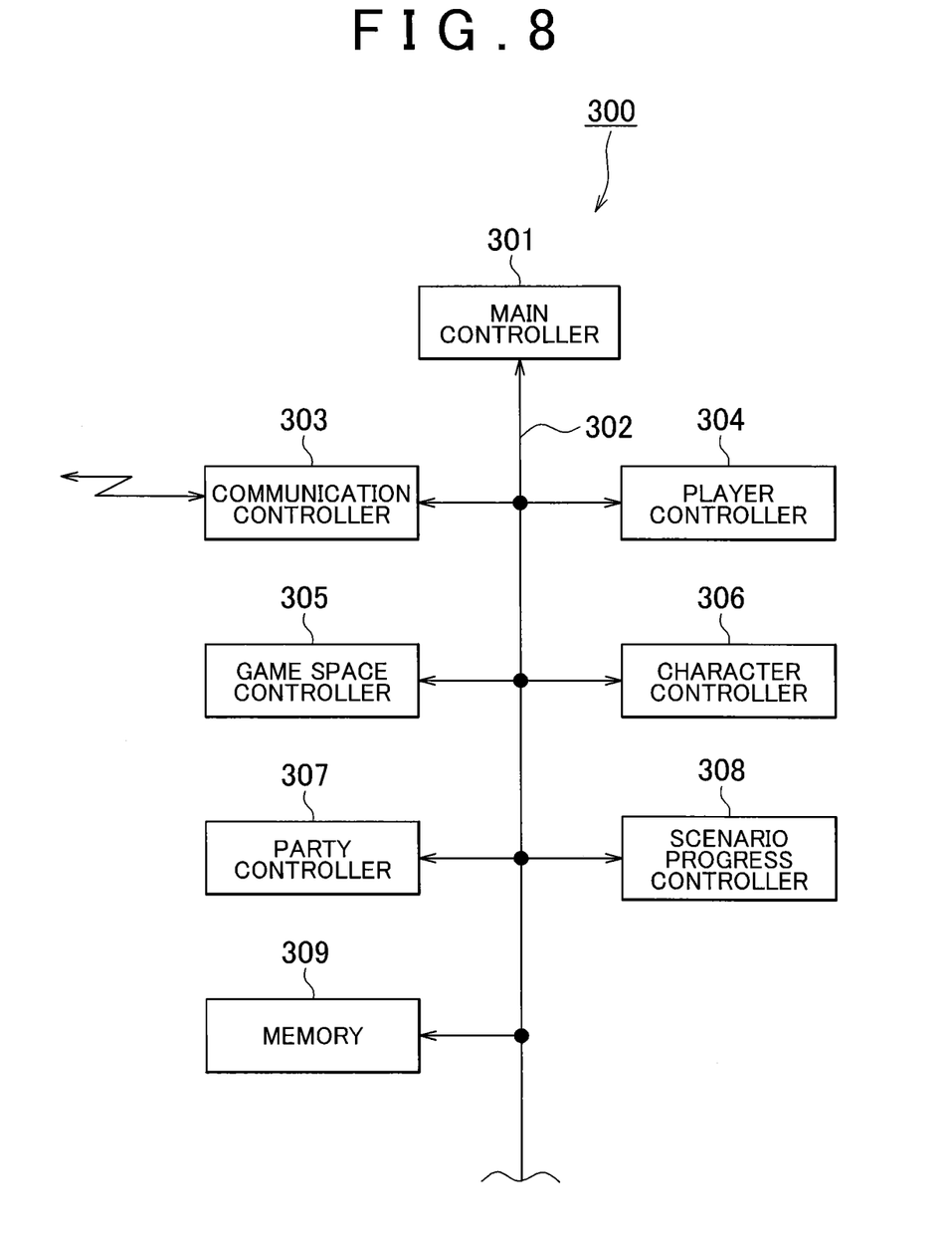
FIG. 8 is a control block diagram that shows an instance of a server to which the invention is applied.

As shown in FIG. 8, the server 300 has a main controller 301, and a communication controller 303 connected with a public communication line, such as the Internet 100, a player controller 304, a game space controller 305, a character controller 306, a party controller 307, a scenario progress controller 308, a memory 309 are connected with the main controller 301 via a bus line 302. FIG. 8 exemplarily shows only portions that relates to the invention, and does not show the whole actual game server 300.

The server 300 as shown in FIG. 8 executes functions shown in respective blocks as shown in FIG. 1 in such a manner that a computer reads and executes game program stored in a memory, such as a memory 309 and the other well-known control program so that a CPU or a memory (not shown) time-dividedly operates by multitask. But, it is also possible to structure the game server 300 by hardwares corresponding to the respective blocks. Otherwise, it is also possible to control each block by a CPU or a MPU dispersedly provided in each block. Such a point is similar in the game device 1 of FIG. 2.

Figure 3:
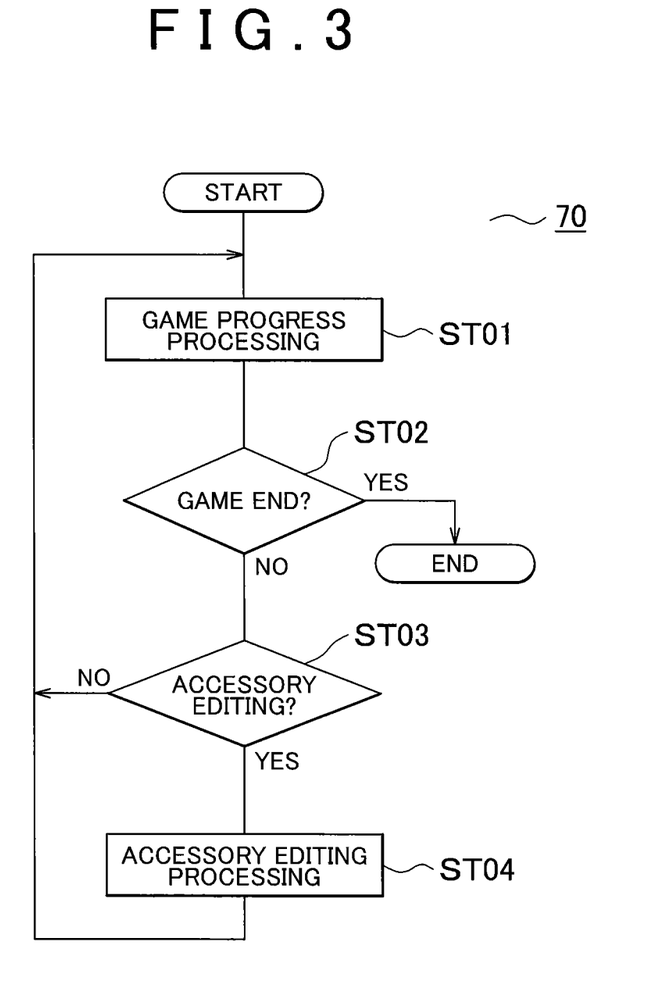
FIG. 3 is a flowchart that shows control steps according to game program as an instance.

Practical steps of game program to be executed in the game device 1 having such a structure are now explained. Firstly, the game device 1 receives an actuation operation by a player, and reads and executes the game program 70 stored in a hard disc drive that is one of the memory 51, so that the game progress controller 52 executes game progress processing (ST01) as shown in FIG. 3. For example, the game to be progressed in this embodiment is a MMORPG (Massively Multiplayer Online Role-Playing Game) wherein many player terminals 200 connected via the Internet 100 (the game device is one of the player terminals) operate respective own player characters so as to get them to act in a game space vertically formed in the memory 309 of the server 300 of a game operator, as shown in FIG. 1. A MMORPG is only an example, and the games to which the invention is applied may be role playing games, adventure games, action games, fighting games and the other kinds of games regardless of presence of a necessity of Internet connection.

Figure 4:
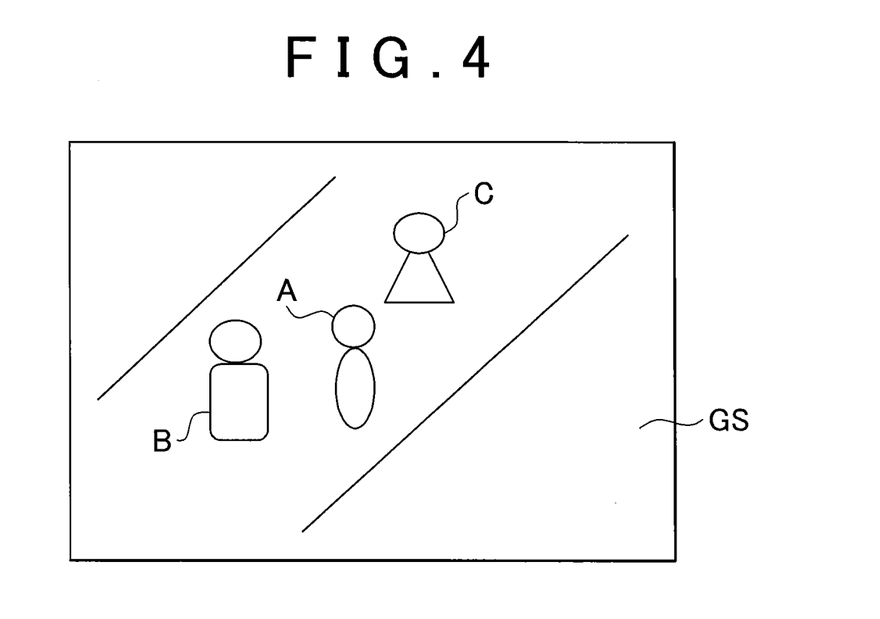
FIG. 4 is a view that shows an instance of a game screen.

As shown in FIG. 4, a player character A appears as the player character operated by the player in the game in a MMORPG in this embodiment. Player characters B and C of FIG. 4 are the player characters by the other player terminals 200, 200 connected with the server 300 of the operator via the Internet 100. The player operates an input through the keyboard 3 or the mouse 4 of the game device 1, and the game progress controller 52 controls to move the player character A in the game space based upon these input signals for doing game progress processing. In this embodiment, the player characters and the other objects (not shown) and a coordinate space wherein these are present and acts are formed by a 3DCG, such as polygon models on a three-dimensional coordinate). The formation by the 3DCG is an example and the formation by a 2DCG may be possible.

Since this embodiment relates to a MMORPG, information regarding actions of the player character A is transmitted to the server 300 at any time via the network controller 58, and the actions of the player character A synchronize with the game space formed by the server 300 and are reflected thereon. On the contrary, information regarding the player characters A, B, C and the other player characters (not shown) in the server 300 is transmitted to the game device 1 and the other player terminals 200, and the actions of the player characters A, B, C and the other player characters (not shown) in the game device 1 and the other player terminals 200 synchronize with the server 300 and are reflected thereon.

More detailedly speaking, a game space GS as a three dimensional virtual space is formed in the memory 309 of the server 300 through the game space controller 305, as shown in FIG. 4, and the player character A operated by the player of the game device 1, and the player characters B and C operated by the players of the other player terminals 200 are located in the game space GS. The respective player characters A, B and C are formed by polygon models mentioned hereinafter, and data for forming the respective player characters A, B and C are individually controlled by the character controller 306 of the server 300 every each player (each player terminal 200). The player character of each player can be freely composed in its appearance, a character class as potential characteristics, an accessory, such as a costume and arms within preset bounds according to each player's favorites with a well-known player character forming program in each player terminal 200. Character data comprising the composed player character are transmitted from each game device 1 to the server 300 via a public communication line, such as the Internet 100, together with a terminal identification ID of the player terminal 200, and the character controller 306 of the server 300 controls the character data of the player character that was transmitted by storing in a memory (not shown) every each player (terminal identification ID). That is, each player character located in the game space GS is a proper character for each player who operates his (her) player terminal 200. The character data of the player character of each player is simultaneously stored in the memory 51 of the player terminal 200 of the player.

If the player outputs an instruction of online game start to the server 300 via his player terminal 200, the main controller 301 of the server 300 reads the character data of the player character of the player out of a memory (not shown) through the character controller 306 and compose a polygon model of the player character to be located in the game space controller 305 and the polygon model of the player character composed by the game space controller 305 is located in a predetermined position in the game space GS in the memory 309. Then, a game start preparation finishes for the player.

Subsequently, "accessory editing processings" in the game program 70 are now explained. As shown in FIG. 3, for instance, the game progress controller 52 of each player terminal (game device 1) 200 executes game progress processing ST01 and determines whether conditions of a finished game (logout), such as a case where a logout command was inputted or a case of game over, were met (ST02). If the conditions of a finished game are not met, the game progress controller determines whether an instruction of the accessory editing was inputted from an input portion, such as the keyboard 3 and the mouse 4, (ST03). If a determination is made that such an instruction was inputted, the accessory editor 53 executes the accessory editing processing (ST04) based upon the instruction from the main controller 50. In this case, the accessory editing processing may be executed, interrupting in the middle of actions (movement, chatting and the like) taken by the player character A in the game space, but the accessory editor 53 may control to prohibit the entering of the accessory editing processing according to the game program 70 based upon a signal indicative of "in battle" outputted from the game progress controller 52 to the accessory editor 53 in such a scene where inconvenience is easy to occur due to a sudden change of the character class, such as in battle with an enemy. In such a case, the battle with the enemy means a process after meeting the enemy, a non-player character that is located in the game space GS of the server 300, which actions are controlled by AI of the scenario progress controller 308, and the player character A which actions are controlled by the scenario progress controller 308 in the game space GS based upon action instructions outputted to the server 300 via the public communication line, such as the Internet 100, by operating the input portion of the player terminal 200 by the player before determining victory or defeat through each other's offense and defense in the game space GS.

Figure 5:
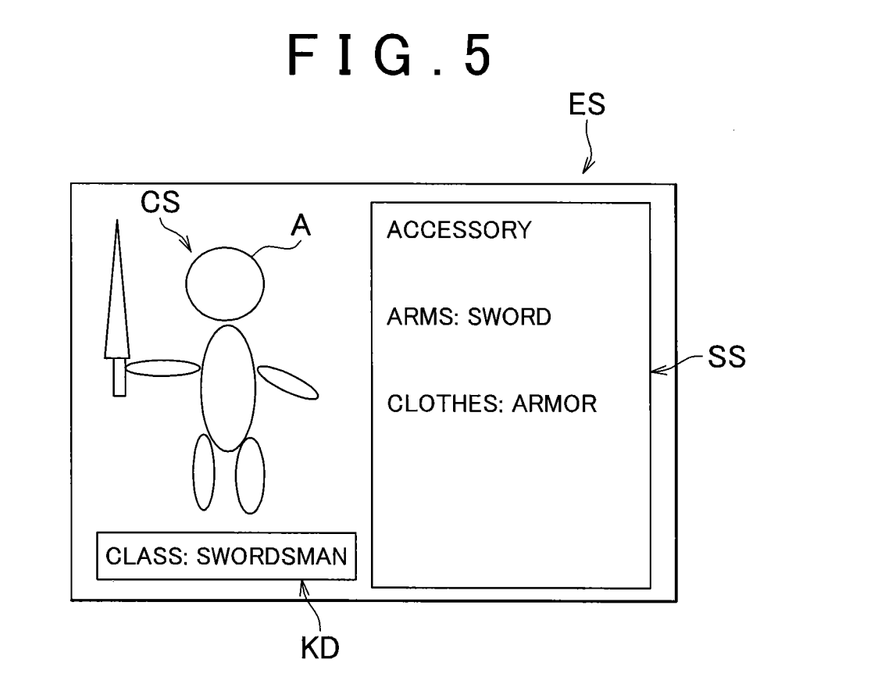
FIG. 5 is a view that shows an instance of the game screen.

For instance, the accessory editor 53 displays an accessory editing processing screen ES regarding player character A composed by the player of the game device 1 as his own player character on the monitor 5, as shown in FIG. 5. In the example as shown in FIG. 5, a character image CS on which the polygon model of player character A is drawn is displayed on a left side of the accessory editing processing screen ES according to the game program 70, and the image CS is displayed based upon the character data stored in the memory 51. On a right side of the screen ES, a selection screen SS of the accessories is displayed. The player character A is drawn based upon the character data through the CG controller 54. For convenience for explanation, only "arms" and "clothes" that are determined by the game program 70 as categories of the accessories are shown, but articles to be worn, such as protective gears, caps, shoes and personal ornaments, and tools and the others, abilities to be used for attack are available as accessories as well as the above-mentioned two kinds of categories of accessories. The accessories may be set in such a manner the player operates the input portion so as to designate these three kinds or more according to the game program 70. On a lower hand of the character image CS of the player character A on the left side of the screen, a character class kind KD presently selected is displayed based upon the character data (In FIG. 5, "swordsman" is displayed).

FIG. 5 shows a state before changing the accessory, and "sword" is equipped for "arms" and "armor" is equipped for "clothes". "Arms" of the categories of the accessories is defined by the game program 70 as a special category for determining the character class, and "sword" is corresponded to the character class "swordsman". So, in a state of FIG. 5, the character class of the player character A is set as "swordsman". If "sword" is equipped in the character class "swordsman", the game program 70 sets so as to make an ability value of the player character the most suitable.

If the player moves a pointer onto the right side of "arms" on the selection screen SS through an operation of the mouse 4 or the like in accessory editing processing ST04 of the game program 70, the arms owned by player character A (that is, the arms that are able to be equipped) are listed up on the monitor 5 by pull-down indication through the accessory editor 53 according to the game program 70. The arms (accessories) that are able to be equipped by the player character are stored in the memory 51 in advance through the game program 70 as a list of arms (accessories) that can be equipped with, and the pull-down indication can be easily displayed on the monitor 5 by referring to such a list through the accessory editor 53. When designating the arms (accessory) that the player wishes for out of the listed up ones through the operation portion, the arms is equipped on the accessory editing processing screen ES.

Figure 6:
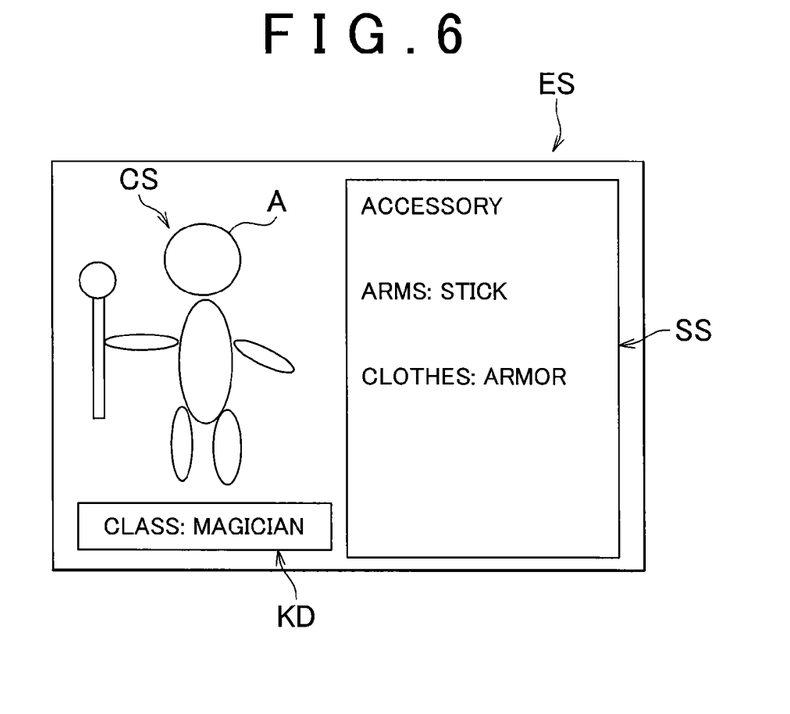
FIG. 6 is a view that shows an instance of the game screen.

If four arms "sword" (presently equipped), "stick", "fishing rod", "hammer" are listed up as the arms that can be equipped with according to the game program 70 and the player selects and designates "stick", for instance, the indication of "arms of the accessory of the accessory editing processing screen ES is changed from "sword" to "stick" through the accessory editor 53. The indication of "arms" on the right side on the screen SS is thus changed into "stick" as shown in FIG. 6, and the image CS of player character A on the left side of the accessory editing processing screen ES is changed from "sword" (FIG. 5) into "stick" (FIG. 6) in the CG image of the arms that the player character A has in a hand through the CG controller 54 and the accessory editor 53. That is to say, the polygon model itself is changed from "sword" into "stick" through the CG controller 54 and the changed is displayed. Furthermore, a character class "magician" is corresponded to "stick" as mentioned hereinafter, and in a state after the change in FIG. 6, the character class of the player character A is set as "magician", and the indication of the character class kind KD on the lower part of the character image CS of FIG. 6 was changed into "magician". The game program 70 sets so as to make an ability value of the player character the most suitable if "stick" is equipped in the character class "magician".

Figure 7:
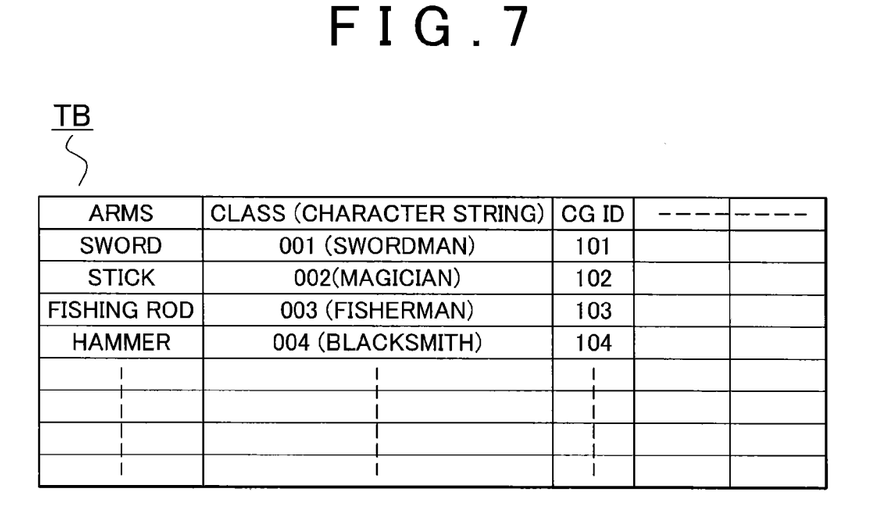
FIG. 7 is a view that shows an instance of an association table.

An association relation between the arms and the character class is now mentioned. In the memory 51, an association table TB as shown in FIG. 7 is stored in advance as a part of the game program 70, and is accessible any time. Such an association table lists up items with which the player character can be equipped as the arms (the other accessories are possible), and the character classes that correspond to the respective arms, that is, the most suitable character classes that shows effects of the arms (the accessories) to the maximum by being equipped with such arms (the accessory) and character strings are shown so as to correspond to each other. And, IDs of the CG (computer graphics) data of the arms (the accessories) are also shown as CGID, corresponding to the respective arms (the accessories). That is, the association table TB also stores the correspondence relation between the accessory with which the player character of the player terminal 200 can be equipped and the computer graphics data of the accessory.

If "stick" is designated and selected out of the list of "arms" of the accessory editing processing screen ES through the operation of the operation portion by the player in the abovementioned embodiment, the accessory editor 53 reviews the association table TB from the information of this "stick" and judges the character class to be changed by searching the most suitable character class to the designated arms according to the game program 70. In this case, the character class that is the most suitable to "stick" is detected as the character class to be changed "002 (character string: magician), and the indication of the character class KD on the accessory editing processing screen ES is changed from the last "swordsman" into "magician" and the character string is displayed as shown in FIG. 6 (an image, such as an icon, that shows the character class may be displayed as well as the character string). Even if the arms is changed, the most suitable character class may be judged to be the same as one of the arms before the change. The CGID "102" that shows the CG data of the accessory to be changed is also detected and determined through the review of the association table TB (means for determining CG), so that the CG controller 54 reads the CG data of CG of the arms that the player character A has in his hand out of the memory 51 and the character image CS displayed on the monitor 5 is changed from the last character image CS equipped with "sword" into CG of the character image CS equipped with "stick" and the changed is displayed.

The memory 51 stores the CG data in connection with the accessories that can be equipped by the player character, such as various kinds of arms and the clothes corresponding to the character classes that are stored in the game program 70, respectively attaching CGIDs thereto. If the CG data of CG corresponding to each arms (accessory) is judged as CGID from the association table TB (only a part of CGIDs is shown in FIG. 7), the corresponding CG data is read out of the memory 51 and the character image CS equipped with the corresponding arms (accessory) is immediately produced and displayed through the CG controller 54. The character data of the player character after the change is stored in the memory 51, updating the last character data. In this case, the character data means data necessary for displaying the player character in the game space GS, such as the character image CS, the accessory and the character class of the player character.

As explained above, the equipment editing processing ST04 of the game program 70 through the accessory editor 53 finishes and the game progress controller 52 continues the game progress processing ST01 according to the game program 70 as shown in FIG. 3. If the arms of the accessory is thus changed into the desired one, the character class in which the ability level of the player character becomes the most suitable due to the changed arms is automatically set. Then, it is possible to suitably and easily change the accessory and the character class of the player character, and it is easy for the game beginner players.

The system wherein it is possible to easily and suitably change the accessory and the character class of the player character as the present embodiment is a very convenient function in a MMORPG. As shown in FIG. 1, game facilities is comprised of the whole structure having two or more player terminals 200 (the game device 1 is also one of the player terminals) connected with the network, such as the Internet 100, and the server 300, and such game facilities is for executing a MMORPG in which the player characters A, B, C and the like corresponding to the respective player terminals 200 take actions in a common game space (the same coordinate system) formed on the server through an input operation in each player terminal 200. In a MMORPG, for instance, a party is formed (so-called "party formation") so as to battle with an enemy in many cases.

That is, such a party formation command PS that a party is formed with the other players, may be outputted to the server 300 from two or more player terminals 200. In this case, the main controller 301 of the server 300 instructs the player controller 304 to execute such a party formation processing that actions of two or more player characters (that is, the players) shown in the party formation command PS in the game space GS are grouped and the grouped is treated as one. Receiving this instruction, the player controller 304 instructs the character controller 306 to give attribution data showing that the player characters of the respective players shown in the party formation command PS are formed as the same party (if necessary, the attribution data also includes identification data of the other player characters belonging to the party) to their character data stored in the memory (not shown) and to store such data in addresses respectively corresponding to the player characters in the memory (not shown) of the player controller 306, and the character controller 306 execute this. Then, if the attribution data of the player character corresponding to each player stored in the character controller 306 is referred, with the player character of which player the player character presently forms the party is immediately known. A meaning of party formation on information processing is that the party controller 307 controls to battle with a common enemy in cooperation with the player characters forming the party as a group and to distribute and share items or numerical values that can be obtained by the result of the battle in the group.

If respectively different players output the party formation command PS to the server 300 from the respective player terminals 200, the party is formed by the player characters A, B, and C that are operated by the respective players through the player controller 304 and the character controller 306 in FIG. 4, the party controller 307 controls that the actions of the player characters A, B, C are integrally controlled as a group, that is, the player characters cooperatively take actions as a group, and all player characters formed as the party cooperatively battle with enemy when meeting the enemy. The largest merit to form a party is shown in the battle. It is general that the player characters are set by server game program of a MMORPG executed in the server 300 and the game program 70 of the respective player terminals 200 as the player characters are different in attack methods to be proud by their character classes. For example, "swordsman" is proud of physical attack from the front and "magician" is proud of magic attack from the rear. In other words, a parameter of some arms is set on the character class corresponding to such arms so as to make the effect of the arms the biggest according to the server game program and the game program 70. If the party is formed so that the attack methods of which the player characters forming the party are proud are different in the formed party (that is, the arms are different), it is possible to add the attacks that are different in their categories to the enemy and the attacks as the whole party become effective.

When the character class of the player character forming the party is changed to one different from the other player characters in the party in the player terminal 200 having such a player character. In this embodiment, for example, the accessory editor 53 of the player terminal 200 changes the arms according to an input operation received from the player, and graphic object detecting component, such as the CG controller 54, detects an ID (CGID and the like of Fig.7) of a graphic object corresponding to the arms to be changed, such as a CG (computer graphics) model based upon an association table TB (first association relation) referred from the memory 51 or the like. This detected graphic object information (ID of the CG model) is transmitted to the server 300 through the network controller 58 as player character change information together with the change information regarding the character data of the other player character, such as the arms, the clothes and the other accessories and/or the character class as well as the terminal identification ID of the player terminal 200. If there is a change of the CG image of the player character due to the change of the accessory, such as the arms and the clothes, and/or the character class, the CG image data after such a change (or may be the data, such as the identification ID for specifying the image data) that corresponds to the changed accessory, such as the changed arms and the clothes/the character class is also transmitted as a part of the player character change information as well as the CG image data regarding the above-mentioned arms. As a matter of course, the character data of the player character stored in the memory 51 is updated into the changed one.

On the contrary, the server 300 obtains the player character change information transmitted from each player terminal 200 (that is, the change information to each player character forming the party) at any time, and the character controller 306 updates the character data of the player character corresponding to the terminal identification ID that is stored in the memory (not shown) into one corresponding to the changed arms/clothes, character class based upon the player character change information. Through such processing, the server 300 also holds and stores the character data of the player character having the contents the same as the player character stored in the memory 51 that was chanted by the player terminal 200.

And, the server 300 gets the player controller 304 and the character controller 306 through the main controller 301 to search as to whether or not there is the other player that presently forms the party with the player terminal 200 (player character) that outputted the player character change information by referring to the attribution information of the player character corresponding to the player terminal 200 through which the player character change information was outputted. As the result, if the judgment is that there is the other player (party player) that presently forms the party with the player terminal 200 which outputted the player character change information, the judged player is extracted, and the player character change information is transmitted to each player terminal 200 extracted. In each player terminal 200 that received the player character change information regarding the player character of the other player forming the party from the server 300 through the network controller 58, image change component, such as the CG controller 54, changes the image of the player character of the other player forming the party into one corresponding to the changed arms/clothes, character class and stores the changed in the memory 51 based upon the player character change information that was transmitted.

The other player immediately perceives the change of the character class as well as the player himself since the image of the arms that the player character has is changed. In a case where the player characters that met in the game space forms the party, each player generally changes the character class through the operation of each player terminal 200 so that the player characters in the same character class do not overlap. If even a beginner can easily and properly change the character class in a method as shown in this embodiment on the above-mentioned occasion, it is very convenient. Besides, the character class is automatically changed by referring to the association table TB if the arms is changed so as not to have the arms the same as the other player character (and, the change of the arms can be easily perceived by the indication of the CG model of the arms), and the character class can be properly intuitively selected at the time of forming the party, conveniently. Besides, it is not necessary to move to a setting screen and to set the accessories, such as the arms, in detail as the conventional case, and it is possible to change the character class into a proper state with one operation, the change of the arms. Then, the beginner can catch up with the party even if he is slow in such a game that the actions as the whole party proceed, even if one player stops the action of the player character for setting or the like, especially in a MMORPG.

Each player terminal 200 has message transmitting component, such as the network controller 58, that transmits the message inputted through the keyboard 3 or the like to the server 300, and the server 300 has message intermediation component (not shown) for obtaining and mediating the message from each player terminal 200, and transmitting the message to the other player terminal 200 that is a destination of the message. That is, the player terminals 200 have real-time communication means, such as a chat, through the server 300. Then, the players of the player characters belonging to the party can look a way of the screen immediately displayed on the screen due to the change of the arms or the like with their eyes and recognize the corresponding change of the character class and communicate as to whether or not the change of the character class is proper through the communication means, conveniently.

The memory 51 or the like of the game device 1 stores information on the player character, its accessory, the character class, the ability value, the association table and the other attribution, that is, stores in a local, but such information may be stored in the character controller 306 or the like of the server 300 without storing in a local so as to refer to such information through an access of the server 300 if necessary. For example, the association table TB may be stored in the character controller 306 of the server 300 and the game device 1 may have referring component (such as the network controller 58 and the memory 51) for accessing this and referring thereto.

In the above-mentioned embodiment, the accessories excluding the arm (for instance, "clothes"="armor" of FIG. 5 or FIG. 6) are not changed when the character class was changed. But, in another embodiment, the accessories excluding the arms may be changed. For example, the accessories excluding the arms are not basically changed due to the change of the character class, but the accessories may be removed if the equipment in the changed character class is improper. In an explanation referring to FIGS. 5 and 6, "arms" is changed in the equipment editing processing and "character class" is changed from "swordsman" into "magician" thereby. Each accessory has a congeniality value to the individual character class, and its association relation is stored in the memory 51 or the like in advance so as to be accessed and so as to refer to such a relation. Then, the accessory editor 53 may detect the congeniality value between the changed "character class"="magician" and the accessory which has been equipped with "armor" from the above-mentioned association relation so as to remove "armor" from the accessories "clothes" if the congeniality value is not proper (no equipment).

Alternatively, if the above-mentioned congeniality value is not proper, "armor" may be removed from the accessories "clothes" and the accessory editor 53 may detect the congeniality value with the changed "character class"="magician" for all the other accessories owned by the player character A so as to equip with the accessory which congeniality value is the most proper.

EXPLANATION OF REFERENCE NUMBERS

1 ... game device
2 ... main body
3 ... keyboard
4 ... mouse
5 ... monitor
6 ... network cable
70 ... game program

The invention claimed is:

1. Game facilities including a server and two or more player terminals connected through a network, each of the player terminals enables a player character corresponding to the player terminal to take actions in a common game space formed in a memory of the server through an input operation at the player terminal by a player associated with the player terminal; each of said player terminals comprising:
  a first memory that stores an association table indicating a list of accessories with which said player character can be equipped and character classes that are most suitable for each of the accessories, wherein the character class associated with a given accessory shows effects of the accessory to its maximum potential;
  an accessory list display component that displays the list of accessories on a monitor;
  an accessory selection component that selects an accessory for said player character from said list of accessories according to an input operation received from an operation portion of said player terminal;
  a class determination component that determines a character class for said player character according to the selected accessory by referring to said association table and changes said player character's character class into the determined character class, wherein the changed character class and information on the selected accessory form a portion of a player character change information for said player character;
  a change information output that transmits said player character change information to said server through said network,
  wherein said association table stores an association relation between the accessory with which the player character of said player terminal can be equipped and CG (computer graphics) data for the accessories;
  a CG data determiner that updates the CG data of the selected accessory according to the player character change information; and
  an image updater that changes the image of the accessory displayed on the monitor of said player terminal according to said updated CG data of the selected accessory.

2. The game facilities according to claim 1, wherein each player terminal has a receiver that receives said player character change information from said server, and said image updater changes the image of the player characters of the other of the two or more player terminals that form a party with the player character of the player terminal based upon the received player character change information.

3. The game facilities according to claim 1, wherein the server being capable of allowing the player characters corresponding to each player terminal to take actions in the common game space formed in the memory of the server through an input operation of the player terminals, said server comprising:
  a memory unit that stores character data of the player characters corresponding to each of the two or more player terminals;
  a party formation component that to the character data of the player character stored in the memory unit for the two or more player characters indicated in a party formation command when the party formation command indicating that a party of two or more players is formed has been received from the two or more player terminals, wherein the attribution data indicates that the player character is in the party;
  character data updating component that obtains the player character change information and updates the character data of the player character that is stored in the memory unit;
  a party player extracting component that judges as to whether there is another player who forms a party with said player character from which said obtained player character change information has been outputted by referring to the character data of the memory and extracts said another player; and
  an information intermediation component that transmits said player character change information to said player terminal of the extracted other player.

4. The game facilities of claim 1, comprising a computer readable recording medium that stores a game program for allowing a computer included in the game facilities to execute a game with the player character comprising:
  changing an accessory for one of said player characters according to an input operation from the player for said player character;
  accessing and referring to an association relation between the accessory and a character class;
  detecting the character class corresponding to said changed accessory based upon said association relation; and
  changing the character class of said player character into the detected character class.

5. The game facilities according to claim 1 wherein said association table sets arms and the other accessories excluding the arms as the accessories that can be equipped by said player character, said accessory list display component displays said arms as the accessories that can be equipped on said monitor as said list;

said accessory selection component selects one arms from said list displayed on said monitor; and said class determination component determines said character class that corresponds to the arms selected through said accessory selection component.

6. The game facilities according to claim 5, wherein said first memory stores an association relation between the accessories and congeniality values to said character classes so as to access and refer thereto; said player terminal further comprising:

congeniality judging component that detects said congeniality value between the character class corresponding to said selected arms that has been determined through said class determination component and the accessory excluding the arms equipped by said player character from said association relation, and judges whether the detected congeniality value is proper; and accessory change component that controls to take the accessories excluding said arms that has been judged by said congeniality judging component that said congeniality value is improper off the accessories of said player character.

7. The game facilities according to claim 6, wherein after controlling to take the accessories excluding said arms that has been judged that said compatibility value is improper off the accessories of said player character, said accessory change component detects said congeniality value between all accessories excluding said arms that owned by said player character and the character class corresponding to said selected arms from said association relation, and controls to equip said player character with the accessories excluding said arms which congeniality values are proper.

* * * * *